(12) United States Patent
Korechika

(10) Patent No.: US 7,431,330 B2
(45) Date of Patent: Oct. 7, 2008

(54) INFLATOR BAG FOR OCCUPANT RESTRAINT DEVICE AND METHOD OF MANUFACTURING THE INFLATOR BAG

(75) Inventor: Koji Korechika, Ibaraki-ken (JP)

(73) Assignee: Autoliv Development AB, Vargarda (SE)

( * ) Notice: Subject to any disclaimer, the term of this patent is extended or adjusted under 35 U.S.C. 154(b) by 331 days.

(21) Appl. No.: 10/522,343

(22) PCT Filed: Jul. 25, 2003

(86) PCT No.: PCT/JP03/09492

§ 371 (c)(1),
(2), (4) Date: Apr. 14, 2005

(87) PCT Pub. No.: WO2004/011308

PCT Pub. Date: Feb. 5, 2004

(65) Prior Publication Data

US 2005/0173899 A1    Aug. 11, 2005

(30) Foreign Application Priority Data

Jul. 25, 2002   (JP)   ............... 2002-217346
Sep. 12, 2002  (JP)   ............... 2002-267457
Dec. 27, 2002  (JP)   ............... 2002-382407

(51) Int. Cl.
*B60R 21/207*   (2006.01)
*B60R 21/231*   (2006.01)

(52) U.S. Cl. ................ 280/730.1; 280/743.1

(58) Field of Classification Search .............. 280/730.1, 280/743.1; 297/216.1
See application file for complete search history.

(56) References Cited

U.S. PATENT DOCUMENTS 4,010,055 A   3/1977   Oka et al.

(Continued)

FOREIGN PATENT DOCUMENTS

DE   39 34 588   4/1991

(Continued)

OTHER PUBLICATIONS

Japanese Office Action dated Aug. 22, 2006, with partial English-Language translation.

(Continued)

*Primary Examiner*—Christopher Ellis
*Assistant Examiner*—Joseph Rocca
(74) *Attorney, Agent, or Firm*—McGinn IP Law Group PLLC

(57) ABSTRACT

By forming a resin sheet or a metal sheet, an angular-box-shaped bag main body (51) having gore portions (54) on surrounding side faces to ensure its height is formed. A folded line (55) to be folded, in a manner to form a valley line, toward an inside of the box-shaped bag main body (51) is formed in an intermediate portion of each of the gore portions (54) in a height direction. A triangular overlaid and folded portion (56) is formed in an end of each of the gore portions (54a) on each of the surrounding side faces with each corner portion of the angular-box-shaped bag main body (51) being sandwiched between one surrounding side face and another surrounding side face adjacent to the one surrounding side face in which the gore portion (54b) is folded in an overlaid manner in the overlaid and folded portion (56) at a same time when another gore portion on another surrounding side face is folded. The angular box-shaped bag main body (51) is folded so as to be in a flat state by allowing each of the gore portions to be folded in a manner to form a valley line along the folded line (55). By blocking a bottom face being opposite to a ceiling plate (52) with a bottom plate (53), the box-shaped bag main body (51) has a hermetically sealed structure. By configuring above, an inflator bag (50) for a vehicle occupant restraining apparatus is obtained. Thus, the inflator bag (50) is able to be housed in a compact manner and to be developed so as to be in a stable state with a sufficient developing stroke being ensured and able to be processed easily.

15 Claims, 12 Drawing Sheets

U.S. PATENT DOCUMENTS

| | | | |
|---|---|---|---|
| 4,944,529 A * | 7/1990 | Backhaus | 280/743.1 |
| 5,094,476 A | 3/1992 | Chihaya | |
| 5,445,414 A | 8/1995 | Pittman et al. | |
| 5,482,318 A * | 1/1996 | Sollars, Jr. | 280/743.1 |
| 5,568,938 A * | 10/1996 | Lindstrom | 280/743.2 |
| 5,695,242 A * | 12/1997 | Brantman et al. | 297/216.1 |
| 5,839,756 A | 11/1998 | Schenck et al. | |
| 6,158,766 A * | 12/2000 | Kowalski | 280/730.1 |
| 6,296,292 B1 * | 10/2001 | Feldman | 296/68.1 |
| 6,685,791 B1 * | 2/2004 | Frei | 156/250 |
| 6,832,776 B1 * | 12/2004 | Soderstrom | 280/730.1 |
| 2001/0011810 A1 | 8/2001 | Saiguchi et al. | |
| 2004/0007856 A1 * | 1/2004 | Enders et al. | 280/730.1 |

FOREIGN PATENT DOCUMENTS

| | | |
|---|---|---|
| EP | 1 179 456 | 7/2001 |
| FR | 1307286 | 9/1962 |
| GB | 2 263 669 | 4/1993 |
| GB | 2 271 322 | 4/1994 |
| GB | 2 357 466 A | 6/2001 |
| JP | 50-86042 | 7/1975 |
| JP | 62-139740 | 6/1987 |
| JP | 5-85291 | 4/1993 |
| JP | 5-229378 | 9/1993 |
| JP | 8-40177 | 2/1996 |
| JP | 9-123857 | 5/1997 |
| JP | 10-44905 | 2/1998 |
| JP | 10-217818 | 8/1998 |
| JP | 10-512210 | 11/1998 |
| JP | 11-123995 | 5/1999 |
| JP | 2001-122063 | 5/2001 |
| JP | 2004-500274 | 1/2004 |
| WO | WO 00/50270 | 8/2000 |

OTHER PUBLICATIONS

Japanese Office Action dated Apr. 25, 2006 with partial Enlish-language translation.

European Search Report dated Sep. 13, 2007.

European Search Report dated Apr. 4, 2008.

* cited by examiner

*FIG.2*
(a)
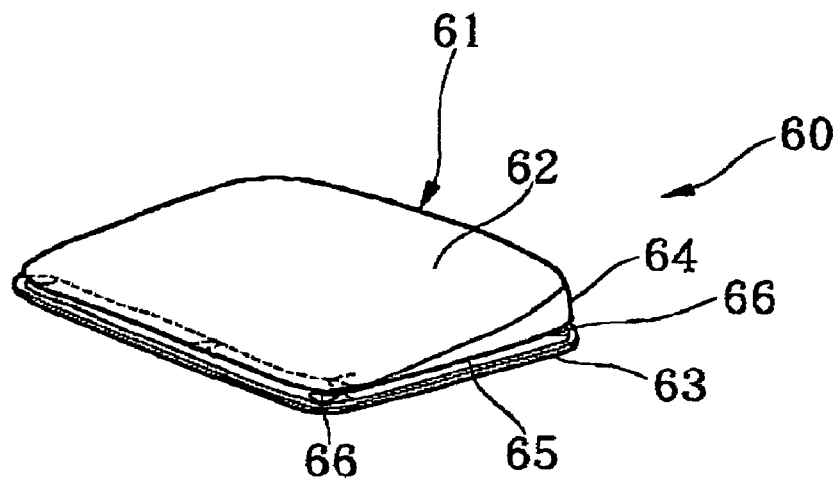
(b)
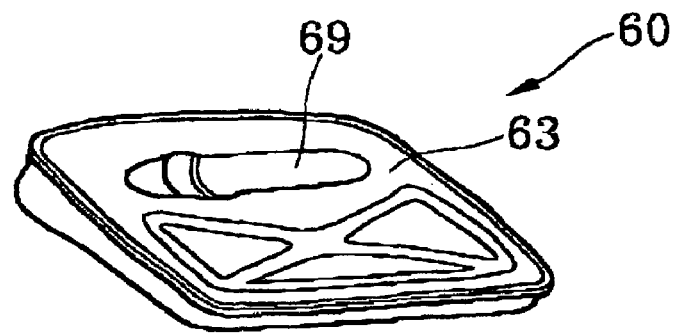
(c)
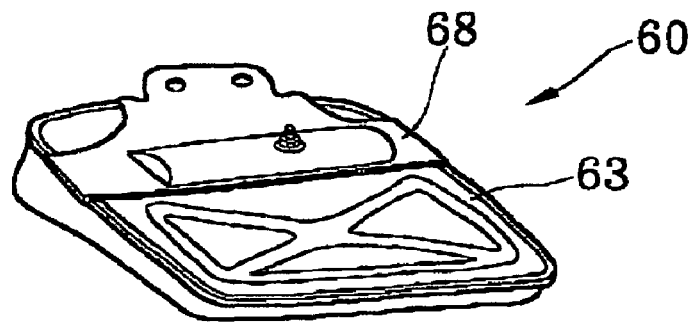

*FIG.3*
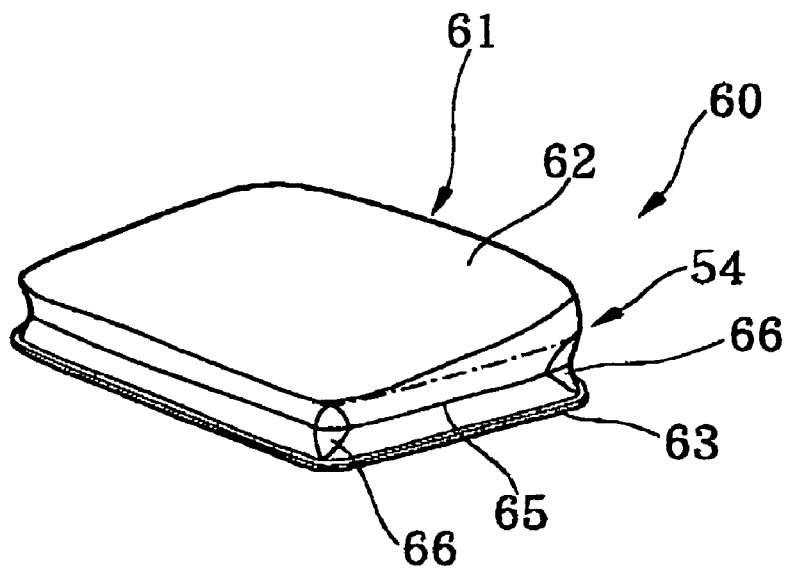
*FIG.4*
(a)
(b)
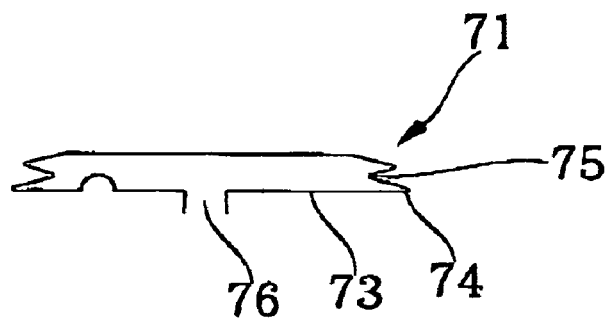
(c)
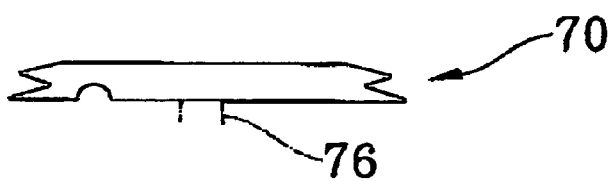

FIG.13
(a)
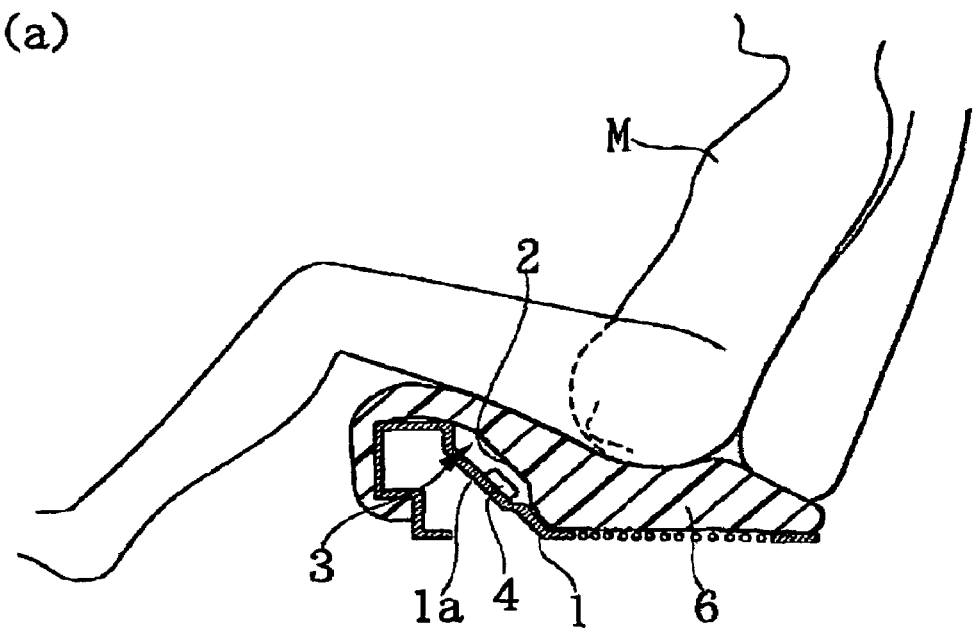
(b)
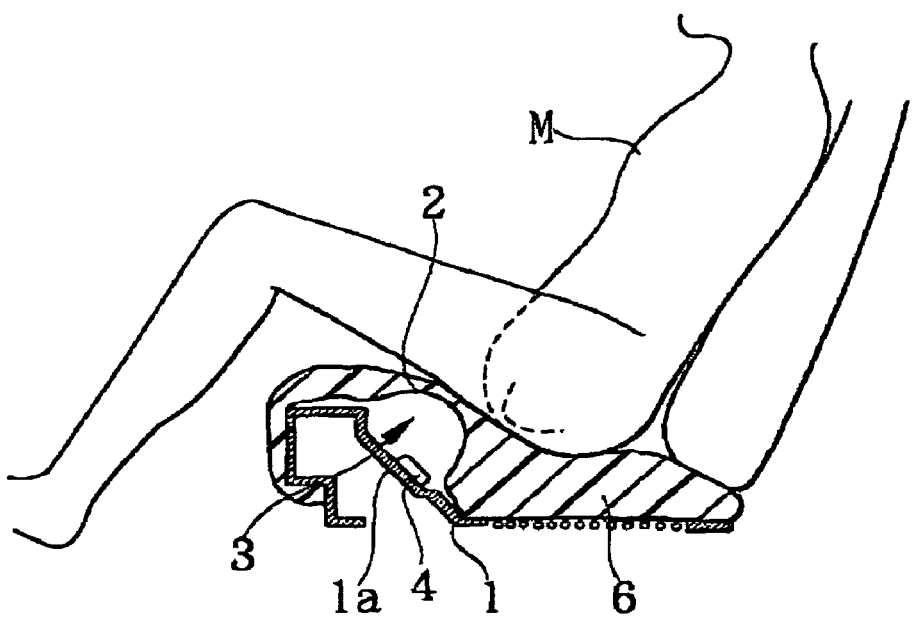

FIG.14
(a)
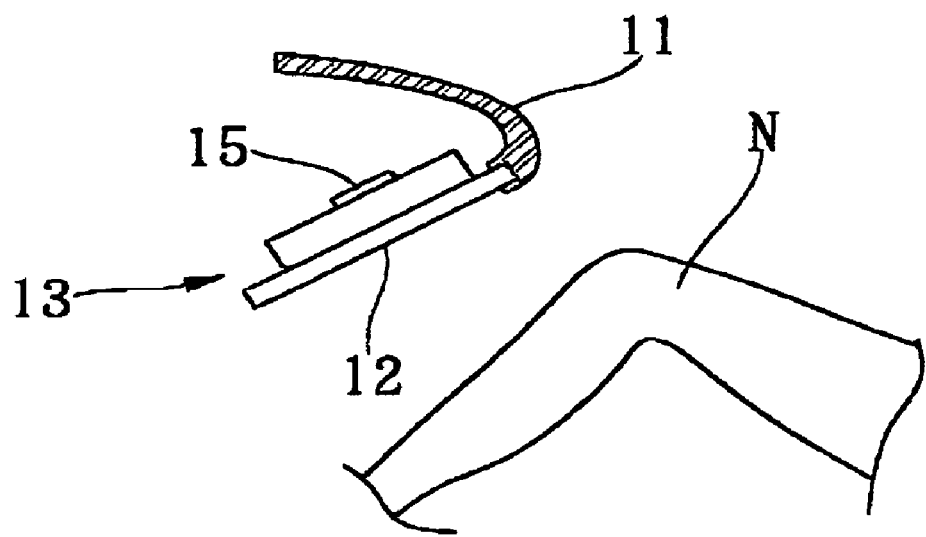
(b)
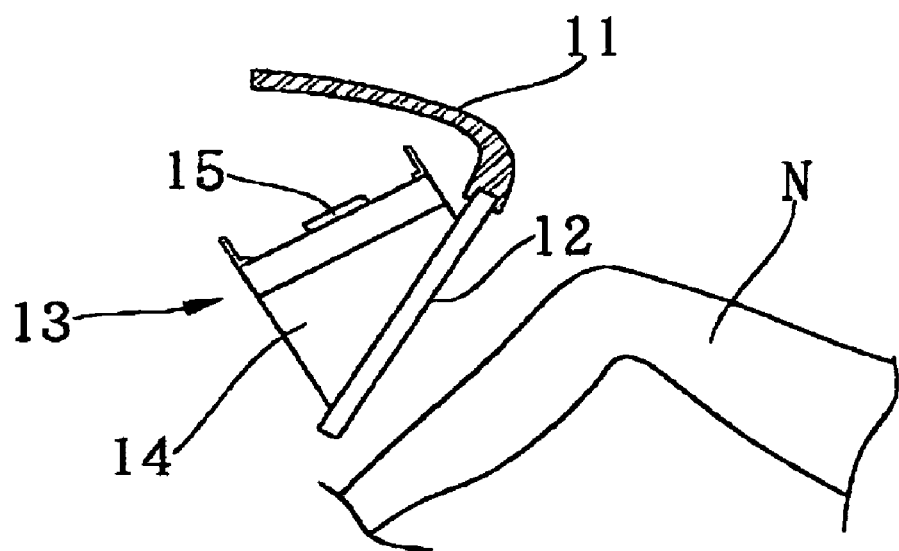

(a) (before expansion)

(b) (during expansion and developing)

INFLATOR BAG FOR OCCUPANT RESTRAINT DEVICE AND METHOD OF MANUFACTURING THE INFLATOR BAG

TECHNICAL FIELD

The present invention relates to an inflator bag for a vehicle occupant restraining device used for a vehicle occupant hip restraining device, a vehicle occupant leg portion restraining device, or a like and a method of manufacturing the inflator bag.

BACKGROUND ART

When a vehicle encounters a collision from the front, a vehicle occupant tends to be moved forward by inertia. When the vehicle occupant wears a seat belt, due to a restraining action of a shoulder belt or a hip belt, a movement forward of the vehicle occupant can be suppressed by a considerable level, even though there are some cases where the restraining action is insufficient A vehicle occupant hip portion restraining device, which is constructed so as to limit the movement forward of the vehicle occupant being seated on a seat by raising a front end of a seat cushion instantly, to prevent the vehicle occupant being seated on the seat from being moved forward, when the vehicle speed is reduced rapidly due to a collision from the front or a like, is known by, for example, Japanese Patent Application Laid-open Nos Hei5-229378 and Hei10-217818, Great Britain Patent No. GB2357466, and a like. Additionally a vehicle occupant leg portion restraining device to protect the leg portion that moves forward, is disclosed in Japanese Patent Application Laid-open Nos. Hei8-40177 and Hei9-123857.

FIG. 13 shows one example of the vehicle occupant hip portion restraining device disclosed in Great Britain Patent No. GB2357466 as this kind of vehicle occupant hip portion restraining device. FIG. 13(a) shows a state before expansion and development of the vehicle occupant hip portion restraining device and FIG. 13(b) shows a state after expansion and development of the vehicle occupant hip portion restraining device. FIGS. 13(a) and 13(b) show a seat frame 1 and on a front portion of this seat frame 1 a concave portion 1a, having a concave shape from a top view, is formed. And on an upper face of the concave portion 1a, a metal sheet 2 is set to cover the concave portion 1a in a state of being stuck on the seat frame 1 by welding, adhering, or a like. In this conventional example an inflator bag 3 is formed of the frame 1 and the metal sheet 2 and the inflator bag 3 is configured so as to be filled with a gas generated from an inflator 4 in an internal space of it.

In a vehicle equipped with this vehicle occupant hip portion restraining device, at time of sharp reduction of speed of the vehicle due to a collision from the front or a like the inflator 4 operates and releases a high-pressure gas into the inflator bag 3. Then the metal sheet 2 making up of the inflator bag 3 expands and develops and raises a front portion of a seat cushion 6 so that a vehicle occupant M being seated on the seat can be prevented from being moved forward.

FIG. 14 shows an example of another vehicle occupant leg portion restraining device (also called as a knee air bag device). FIG. 14(a) shows a state before expansion and development of the vehicle occupant leg portion restraining device and FIG. 14(b) shows a state after expansion and development of the vehicle occupant leg portion restraining device. FIGS. 14(a) and 14(b) show an instrument panel 11, a cover panel 12, and an air bag module 13, which is mounted inside and formed on the back side of the cover panel 12. The air bag module 13 is equipped with an inflator bag 14 (an air bag main body) and an inflator 15 and a gas generated by the inflator 15 fills the inflator bag 14.

In a vehicle equipped with the vehicle occupant leg portion restraining device, at time of sharp reduction of speed of the vehicle due to the front collision or a like the inflator 15 operates and releases the high-pressure gas into the inflator bag 14. Then the inflator bag 14 is expanded and developed and pushes out the cover panel 12 so that a leg portion N of the vehicle occupant being seated on the seat is restrained by the cover panel 12; as a result, during the impact when the leg portion N collides with equipment in the vehicle can be reduced.

Incidentally, when the inflator bag used for this kind of vehicle occupant restraining device is constructed as a metal single good part, as shown in FIG. 15 conventionally, an inflator bag is configured of two pieces of metal sheets 21 and 22 being stuck together by the welding (A dotted line 23 shows a welding section.), furthermore, as shown in FIG. 16 conventionally, an inflator bag is configured as a bellows-type having a peripheral wall 25 being a bellows shape. Though the inflator bag, shown in FIG. 15, is difficult to ensure a developing stroke S and is inferior in the energy-absorption, because the size in the direction of height is limited, and more, it has a problem that development shape tends to become unstable. On the other hand, the inflator bag, shown in FIG. 16, is easy to ensure a developing stroke S, though, its processing is difficult, and also, it has a problem that the height when the inflator is shrinking can not be made small.

In view of the above, it is an object of the present invention to provide an inflator bag for a vehicle occupant restraining device, which is capable of being housed compactly, and of developing with a stable state securing an enough developing stroke, and of which the processing is easy, and a method of manufacturing the inflator bag.

DISCLOSURE OF THE INVENTION

The invention as set forth in claim 1 is characterized in that, there is provided an inflator bag for a vehicle occupant restraining device being able to expand and develop by a high-pressure gas filled in the inflator bag and is capable of restraining a vehicle occupant by being expanded and developed, including: a box-shaped bag main body having gore portions on surrounding side faces to ensure its height, wherein, in each of the gore portions, a folded line to be folded toward an inside of the box-shaped bag main body is formed in an intermediate portion in a height direction of each of the gore portions, which is used to allow each of the gore portions to be folded, and wherein an overlaid and folded portion is formed in an end of each of the gore portions on each of the surrounding side faces with each corner portion of the box-shaped bag main body being sandwiched between one surrounding side face and another surrounding side face adjacent to the one surrounding side face wherein each of the gore portions is folded in a overlaid manner in each of the overlaid and folded portions at a same time when another gore portion on another surrounding side face is folded and wherein the box-shaped bag main body is folded in a manner so as to be in a flat state when each of the gore portions is folded in a manner to form a valley line along the folded line.

The inflator bag of the invention can ensure enough developing stroke because of having the gore portions on the surrounding side faces to ensure its height. In each of the gore portions to ensure its height, the folded line to be folded toward the inside of the inflator bag is formed and on a corner portion is formed a triangle overlaid and folded portion at a same time so that the inflator bag can be folded in a flat state and can be housed in a thin and compact state. Furthermore, when the inflator bag is developed, by a stretch of the folded line portion, the inflator bag can be developed in a stable state with a uniform height. Moreover, the bag main body to be expanded and developed can be configured of a resin sheet or a metal sheet by merely forming the folded line on each of the gore portions after being made up in a box-shape, so that, processing of the bag main body is easy compared with a bellows type bag main body.

The invention as set forth in claim 3 is related to the inflator bag for a vehicle occupant restraining device as set forth in claim 1 and characterized in that, the box-shaped bag main body and the bottom plate are integrally formed.

Like in this case, forming the box-shaped bag main body and the bottom plate integrally can ensure a high hermeticity, because a process of joining the box-shaped bag main body and the bottom plate with a welding or a like can be omitted.

More, the invention as set forth in claim 5 is related to the inflator bag for a vehicle occupant restraining device as set forth in claim 1 and characterized in that, the main body having a rectangular cross-section whose longitudinal side is relatively thinner than its horizontal side is so constructed that opening faces on both sides of a tube-shaped body are blocked with end face plates and side face plates serving as the longitudinal side of the tube-shaped body and the end face plates make up the gore portions.

According to the configurations as set forth in claim 4, on the bag main body are formed the gore portions made up of the side face plates of the rectangular tube-shaped body and the end face plates to block the opening faces on both sides of the rectangular tube-shaped body, as a result, enough developing stroke can be ensured.

Furthermore, in each of the gore portions is formed the folded line to be folded toward the inside of the inflator bag and in an end of each of the gore portions on one surrounding side which sandwiching a corner portion of the angular-box-shaped bag main_body is formed a triangle overlaid and folded portion at a same time so that the inflator bag can be folded in a flat state and can be housed in a thin and compact state. Then, when the inflator bag is developed, by a stretch of the folded line portion, the inflator bag can be developed in a stable state with a uniform height so that a support performance can be improved. Still the angular-box-shaped bag main body to be exposed and developed is, preparing the tube-shaped main body having a rectangular cross-section at first, so constructed that opening faces on both sides of the tube-shaped main body are blocked with end face plates, as a result, it is able to produce the inflator mentioned above more easily compared with the bellows-type inflator.

More, the invention as set forth in claim 6 is related to the inflator bag for a vehicle occupant restraining device as set forth in claim 4 and characterized in that, the tube-shaped body is so constructed that plates making up the tube-shaped body have unequal wall thicknesses wherein wall thicknesses of its upper-face plate and its lower-face plate both serving as horizontal sides of the tube-shaped body are large and wall thicknesses of its side face plates serving as longitudinal sides are relatively thinner than the wall thicknesses of the upper-face plate and the lower-face plate and wall thicknesses of the end face plates are equal to the wall thicknesses of the side face plates.

When the inflator is expanded and developed by filling with the high-pressure gas internally, it is likely to happen that the upper-face plate and the lower-face plate serving as a surface having a wide width of the inflator are expanded in a potbelly state, though in the inflator bag mentioned above of the present invention, the side face plates of the tube-shaped body and the end face plates to block the opening faces on both sides of the tube-shaped main body, which make up of the gore portions, are produced thin, and the upper-face plate and the lower-face plate of the tube-shaped body making up of the upper-face and the lower face of the inflator main body, respectively, are produced thick. As a result the upper-face plates and the lower-face plates making up the inflator are expanded not in the potbelly state but in a uniform manner because the upper-face plates and the lower-face plates are strengthened with setting the thickness relatively thicker than the thickness of the gore portions. Therefore, for example, in case the hip portion or the leg portion of a vehicle occupant being seated on the seat is supported using the upper face portion of the inflator bag, energy can be picked and absorbed by the upper face evenly. Furthermore, the gore portion has a relatively thinner thickness compared with the thickness of the upper-face plates and the lower-face plates so that the inflator can be expanded and developed quickly.

The invention as set forth in claim 7 is characterized in that, there is provided an inflator bag for a vehicle occupant restraining apparatus being able to expand and develop by a high-pressure gas filled in the inflator bag and is capable of restraining a vehicle occupant by being expanded and developed, including:

a hollow body being opened at its both sides and having a cross-sectional structure in which both sides of the hollow body are dented in a U-shaped manner toward an inside of a tube-shaped body in one diameter direction out of two diameter directions intersecting at right angles on the hollow body and both sides of the hollow body are crushed in a manner so as to be in a plane state in another diameter direction, wherein a bag main body is formed by blocking opened portions of the hollow body on both sides with end face plates and the bag main body is crushed in a manner so as to be in a flat state on both sides in the other diameter direction.

More, the invention as set forth in claim 8 is related to the inflator bag for a vehicle occupant restraining device as set forth in claim 7 and characterized in that, by denting, in the U-shaped manner, portions on both sides of the tube-shaped body toward its inside portions in the one diameter direction out of the two diameter directions intersecting at the right angles on the tube-shaped body and, at a same time, by crushing portions on both sides of the tube-shaped body in the manner so as to be in the plane state in the other diameter direction, the hollow body being opened at both ends and having the cross-sectional structure in which the tube-body is crushed and wherein a bag main body is formed by blocking opened portions of the hollow body with end face plates using both sides on which the hollow body is dented in an inside direction and the end face plates as gore portions and wherein the bag main body is folded in a manner so as to be a flat state by further denting portions on both sides having been dented toward an inside direction of the hollow body and serving as the gore portions and the end face plates and, at a same time, by further crushing portions on both sides in the other diameter direction.

According to the configurations as set forth in claim 7 or claim 8, the gore portion, which is made up of the both sides having been dented toward the inside direction of the hollow body and the end face plates to block the opening faces on both sides of the hollow body, is ensured, as a result, enough developing stroke can be ensured. Furthermore, the bag main body is folded in a manner of a flat state by crushing the hollow body with further denting the gore portions. Then the bag main body can be folded in the flat state and can be housed in a thin and compact state. Furthermore, when the bag main body is developed, by stretching the gore portions, the bag main body can be developed in a stable state with a uniform height. Then, a support performance can be improved. Still the hollow bag main body to be exposed and developed is, at first the hollow main body is prepared and is formed to the hollow body which has a transformation section nearly square by crushing in some measure, so constructed that opening faces on both sides of the hollow main body are blocked with end face plates, as a result, it is able to produce the inflator mentioned above more easily compared with the bellows-type bag main body.

More, the invention as set forth in claim 9 is related to the inflator bag for a vehicle occupant restraining device as set forth in claim 7 and characterized in that, each of the end face plates has a shrunken portion formed so as to be placed in the inside of the hollow body and to be developed at a time when the hollow body is filled with the high-pressure gas.

The invention as set forth in claim 10 is related to the inflator bag for a vehicle occupant restraining device as set forth in any one of claim 1 to claim 9 and characterized in that, the inflator bag is used for restraining a hip portion of a vehicle occupant, which is mounted in a front lower portion of a seat cushion in a vehicle and expands and develops by being filled with the high-pressure gas at the time of sharp reduction of speed of the vehicle to raise a front seat face of the seat cushion which prevents the vehicle occupant being seated on a seat from being moved forward.

The invention as set forth in claim 11 is related to the inflator bag for a vehicle occupant restraining device as set forth in any one of claim 1 to claim 9 and characterized in that, the inflator bag is used for restraining a leg portion of a seated vehicle occupant which is placed in a lower portion of an instrument panel of the vehicle and expands and develops at the time of being filled with the high-pressure gas at the time of sharp reduction of speed of the vehicle.

The invention as set forth in the claims is characterized in that, there is provided a method for manufacturing of an inflator bag for a vehicle occupant restraining apparatus being able to expand and develop by a high-pressure gas filled in the inflator bag and is capable of restraining a vehicle occupant by being expanded and developed, including: a step of forming a tube-body having an approximately rectangular cross-section in which each of longitudinal sides is relatively thinner than each of horizontal sides by deforming a cross section of a pipe cut so as to have a specified length; a step of forming a folded line along which each of side face plates serving as each of the longitudinal sides of the tube-shaped body is folded in a manner to form a valley line toward an inside portion of the tube-shaped body in an intermediate portion in its height direction; a step of forming a folded line along which each of end face plates is folded in a manner to form a valley line toward an inside portion of the tube-shaped body in an intermediate portion in its height direction, which is used when opening faces on both sides of the tube-shaped body are blocked with the end face plates; a step of forming a box-shaped main body by blocking the opening faces on both sides of the tube-shaped body with the end face plates and by using side face plates serving as longitudinal sides of the tube-shaped body and the end face plates as gore portions; a step of forming an overlaid and folded portion at an end of each of the gore portions in a manner that each of corners of the box-shaped body is sandwiched between one surrounding side face and another surrounding side face adjacent to the one surrounding side face and each of the gore portions is folded in an overlaid manner in the overlaid and folded portion at a same time when another gore portion on another surrounding side face is folded; a step of obtaining an inflator bag folded so as to be in a flat state by folding, in a manner to form a valley line, each of the gore portions made up of the side face plates and end face plates along the folded line.

According to the configurations as set forth in the claims, by deforming a pipe body having a round cross-section, the tube-shaped body having an approximately rectangular cross-section is formed and by blocking the opening faces on both sides of the tube-shaped body the rectangular box-shaped bag main body is completed so that it becomes easy to form the bag main body. Further, in the bag main body, are the gore portions to ensure the height formed, as a result, enough developing stroke can be ensured. Furthermore, in each of the gore portions is formed the folded line to be folded toward the inside of the inflator bag and in an end of each of the gore portions on one surrounding side which sandwiching a corner portion of the angular-box-shaped bag main body is formed a triangle overlaid and folded portion at a same time so that the inflator bag can be folded in a flat state.

Therefore, for example, welding and hemming processing can be used to join the end face plate with the rectangular-shaped tube body. Furthermore the triangle overlaid and folded portion can be formed on the side of the end face plate or on the side of the side face plate. Forming the folded line or the overlaid and folded portion can be easily reformed by forming in advance a fold line when the round-shaped tube is transformed or processing of the end face plate is performed.

Furthermore, the invention as set forth in the claims is characterized in that, there is provided a method for manufacturing of an inflator bag for a vehicle occupant restraining apparatus being able to expand and develop by a high-pressure gas filled in the inflator bag and is capable of restraining a vehicle occupant by being expanded and developed, a step of forming a tube-shaped body being opened at its both ends and having a cross-sectional structure in which both side portions of a circular pipe cut so as to have a specified length are dented toward its inside in one diameter direction out of two diameter directions intersecting at right angles and both side portions in another diameter direction are crushed so as to be in a plane states and a step of obtaining a hermetically sealed-structured inflator bag being folded so as to be in a flat state by crushing both side portions of the tube-shaped body in the another diameter direction.

Further, the invention as set forth in the claims is related to the method of manufacturing the inflator bag for a vehicle occupant restraining device as set forth in the claims and characterized in that, further includes: a step of forming a tube-shaped body being opened at its both sides and having a cross-sectional structure in which a circular shape is crushed by denting both side portions of a circular pipe cut so as to have a specified length toward its inside in one diameter direction out of two diameter directions intersecting at right angles and by crushing both side portions in another diameter direction so as to be in a plane state; a step of forming a bag main body having both side portions dent toward an inside of the tube-shaped body and the end face plates used as gore portions by blocking opened portions on both sides of the tube-shaped body with the end face plates; and a step of further denting, when the bag main body is folded so as to be in a flat state, both side portions dent toward an inside of the tube-shaped body serving as the gore portions and the end face plates serving as the gore portions toward the inside of the tube-shaped body and, at a same time, further crushing both side portions in another diameter direction so as to be in a flat state.

According to the configurations as set forth in the claims and 19, the bag main body is completed, by using the round-shaped tube with denting and crushing the both side faces in a U-shaped state to form the tube-shaped body having a transformed section, and then by blocking opened portions on both sides of the tube-shaped body with the end face plates, so that it becomes easy to form the bag main body. More, in the bag main body are the gore portions made up of the both side faces with the concave-shape and the end face plates of the tube-shaped body formed, as a result, enough developing stroke can be ensured. Furthermore, since the bag main body is folded in a flat state by crushing and further denting the gore portions toward inside so that the bag main body can have a compact shrinkage form.

Therefore, for example, welding and hemming processing can be preferably used to join the end face plates. Furthermore, when the round-shaped tube (work-piece) is transformed or the end face plate (work-piece) is processed, it is easy to re-fold these work-pieces in a flat state, if fold lines are formed in advance on these work-pieces.

Additionally, since the tube-shaped body making up the bag main body is formed by transforming the round-shaped tube, the process of manufacturing the bag main body can be done at a low cost.

As described above, according to the inflator of the present invention, the inflator can develop in a stable state ensuring enough developing stroke. Furthermore the inflator can be folded in a flat state so as to be housed in a thin and compact state.

More, the bag main body which expands and develops can be configured more easily compared with the bag main body of the bellows, because by preparing the tube-shaped body, at first, and by blocking the both end openings of the end face plates, after that, the process of forming the bag main body which expands and develops finishes.

Furthermore, the processing of the bag main body that expands and develops can be achieved easily. Because, after the process of forming the resin sheet or the metal sheet in a rectangular box-shaped, the bag main body can be configured by merely forming the folded line on the gore portion.

With the above configuration, forming the bag main body and the bottom plate integrally can ensure a highly hermeticity, because a process of joining the bag main body and the bottom plate with a welding or a like can be omitted.

Furthermore, the side face plates of the tube body and the end face plates to block the opening faces on both sides of the tube body, which make up the gore portions, are produced thin and the upper-face plate and the lower-face plate of the tube body making up of the upper-face and the lower face of the inflator main body respectively are produced thick.

As a result the upper-face plates and the lower-face plates making up the inflator expand not in a state of the potbelly but in a uniform state. Therefore, for example, in case the hip portion or the leg portion of a vehicle occupant being seated on the seat is supported, energy can be absorbed evenly. Furthermore, the gore portion has a relatively thinner thickness so that the inflator can expand and develop quickly.

BRIEF DESCRIPTION OF THE DRAWINGS

FIG. 1(a) is a perspective view in a state of shrinking, FIG. 1(b) is a perspective view during developing, and FIG. 1(c) is a-perspective view in a state of full development. And FIG. 2 is a block diagram showing configurations of an inflator bag according to a second embodiment of the present invention, FIG. 2(a) is a front perspective view, FIG. 2(b) is a back perspective view, and FIG. 2(c) is a back perspective view in a state setting with an inflator, FIG. 3 is a perspective view in a state of expansion and development of the inflator bag shown in FIG. 2, and FIG. 4 is a process diagram showing a method of manufacturing the inflator bag shown in FIG. 2 in order of processes, and also FIGS. 4(a), 4(b), and 4(c) are process diagrams for showing a method of manufacturing the inflator bag in order of processes. FIG. 6(a) is an appearance perspective view in a before state of shrinking (or in a process of developing), FIG. 6(b) is an appearance perspective view in a process during shrinking (or a process during developing), FIG. 6(c) is an appearance perspective view in a process of shrinking (or before state of developing), FIG. 7(a) is a process diagram and FIG. 7(b) is a perspective view of a formed rectangular tube body.

Moreover.

FIGS. 11(a), 11(b), and 11(c) are process diagrams showing a method of manufacturing the inflator bag in order of processes, FIGS. 12(a), 12(b), and 12(c) are process diagrams showing a method of manufacturing the inflator bag in order of processes.

FIG. 13 is a block diagram showing a conventional vehicle occupant hip portion restraining device, FIG. 13(a) is a cross-sectional view showing configurations of a conventional inflator bag in a before state of expansion and development and FIG. 13(b) is a cross-sectional view showing configurations of the inflator bag in a state after expansion and development, FIG. 14 is a block diagrams showing a conventional vehicle occupant leg portion restraining device, FIG. 14(a) is a cross-sectional view showing configurations of a conventional inflator bag in a before state of expansion and development and FIG. 14(b) is a cross-sectional view showing configurations of the inflator bag in a state after expansion and development.

PREFERRED EMBODIMENTS TO CARRY OUT THE INVENTION

Hereinafter, preferred embodiments of the present invention will be described based on the drawings.

First Embodiment

Figure 1:
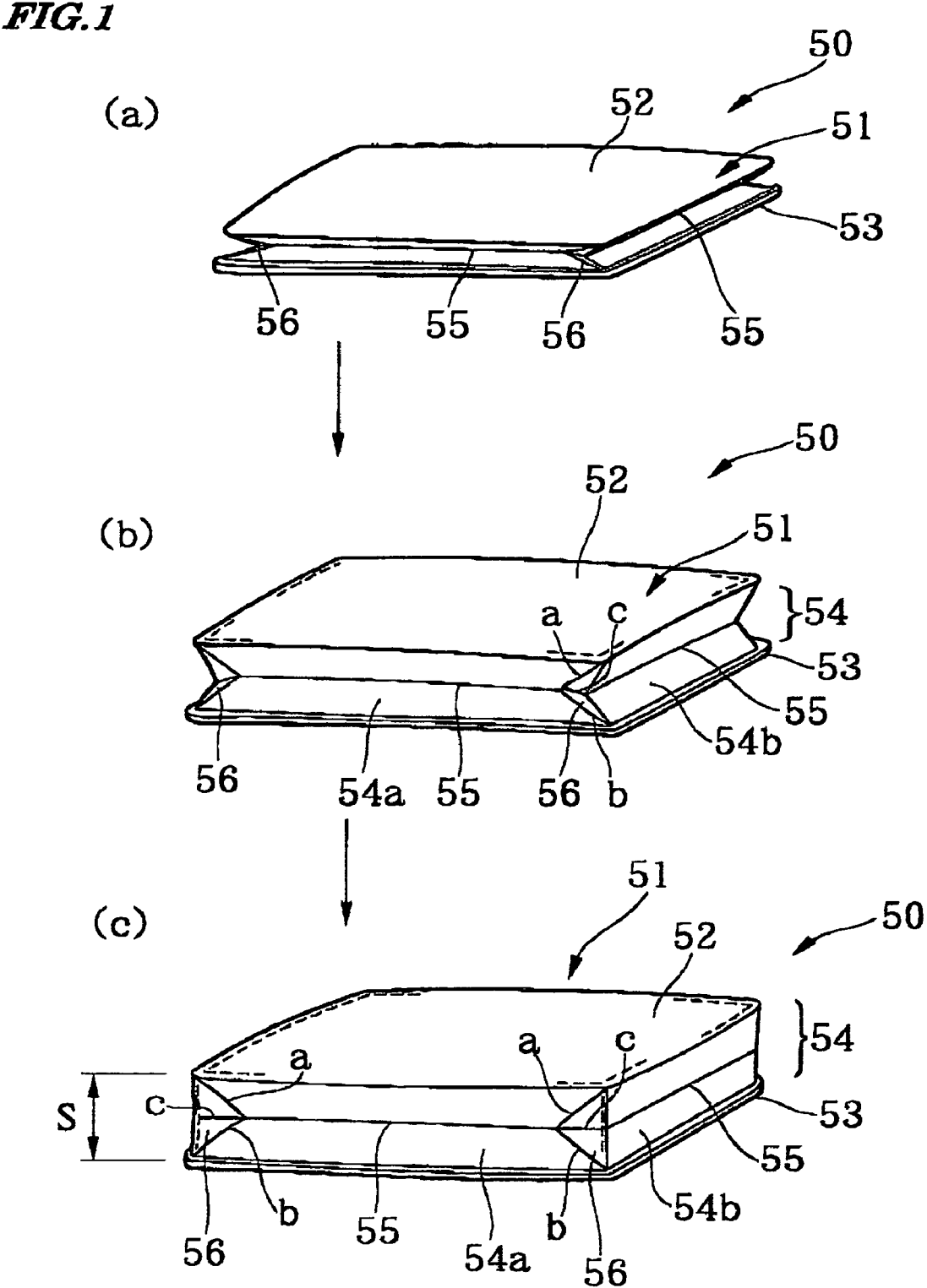
FIG. 1 is a perspective view showing configurations of an inflator bag according to a first embodiment of the present invention.

FIG. 1 is a perspective view showing configurations of an inflator bag 50 according to a first embodiment of the present invention, FIG. 1(a) shows a state of shrinking, FIG. 1(b) shows a state during developing, and FIG. 1(c) shows a state of full development, respectively.

The inflator bag 50 is, as shown in FIG. 1, configured to have a hermetically sealed structure that expands and develops by a filling of a high-pressure gas and made up of a rectangular box-shaped bag main body 51, being a formed body such as a resin sheet or a metal sheet, and a bottom plate 53, which blocks a bottom face, being opposite to a ceiling plate 52 of the bag main body 51. The bottom plate 53 can be formed with the bag main body 51 integrally and, when a processing is difficult, can be joined with the bag main body 51 later by swaging or welding.

The rectangular box-shaped bag main body 51 has gore portions 54 on surrounding side faces to ensure its height size and in each of the gore portions 54, a folded line 55 to be folded toward an inside in a valley manner is formed in an intermediate portion in a height direction of the gore portions 54. Moreover, to make gore portions 54a and 54b, which are adjacent each other sandwiching a corner portion, be able to be folded surely without an interference with each other even on the corner portion, a triangle-shaped overlaid and folded portions 56 to be folded on a folded portion that is folded together with folding of the gore portion 54b on another surrounding side face, are formed in an end of each of the gore portions 54a on one of surrounding side face sandwiching the corner portion. The triangle-shaped overlaid and folded portion 56 is folded on an a line and a b line formed on a triangular outside ends, as shown in FIGS. 1(b) and (c), in a manner to form a valley and folded on a c line formed on the folded line 55 in a manner to form a mountain so as to be overlaid on the adjacent gore portions 54b.

Then, as shown in FIG. 1(a), by folding each of the gore portions 54 to be folded toward the inside in a manner to form valley along the folded line 55 so as to fold the rectangular box-shaped bag main body 51 flatly so that the inflator bag 50 in the shrinking state, as shown in FIG. 1(a), is formed. Actually, after this, for example, by forming a gas outlet of the inflator with a small hole installed on the bottom plate 53 and fixing the inflator with the bottom plate 53, an air bag module is completed.

When developing, as shown in FIG. 1(c), the inflator bag 50 can ensure enough developing stroke S because of having the gore portions 54 to ensure its height on the surrounding side faces. In each of the gore portions 54 to ensure its height, the folded line 55 to be folded toward the inside of the inflator bag 50 in a manner to form valley line is formed and on the corner portion is formed the triangle overlaid and folded portion 56 at a same time so that the inflator bag 50 can be folded in a flat state, as shown in FIG. 1(a), and can be housed in a thin and compact state. Furthermore, when the inflator bag 50 is developed, as shown in FIG. 1(c), by a stretch of the folded lines 55, the inflator bag 50 can be developed in a stable state with a uniform height. Moreover, the bag main body 51 to be expanded and developed can be configured of a resin sheet or a metal sheet by merely forming the folded line 55 on each of the gore portions 54 after being formed in a box-shape, so that, processing the bag main body 51 is more easily compared with a bellows-type bag main body and has an advantage that can be offered at a low cost.

Furthermore, the inflator bag 50 can be used as a vehicle occupant hip portion restraining device shown in FIG. 13 and as a vehicle occupant leg portion restraining device shown in FIG. 14. (In following embodiments, same things will be mentioned.)

Second Embodiment

Moreover, FIG. 2 is a perspective view for showing configurations of an inflator bag 60 according to a second embodiment of the present invention, FIG. 2(a) is a block diagram of a front side, FIG. 2(b) is a block diagram of a back side, and FIG. 2(c) is a block diagram of back side in a state set with an inflator. FIG. 3 shows is the inflator bag 60 in a state of expansion and development.

The inflator bag 60, as shown in FIG. 2, a height of gore portions 64 of a bag main body 61, having a square shape from the top, of one surrounding side (front side in FIG. 2(a) and FIG. 3) and a height of the gore portions 64 of the bag main body 61 of another surrounding side (back side in FIG. 2(a) and FIG. 3), above both surrounding sides are facing each other in a opposite situation, are set in different sizes, respectively, as a result, the bag main body 61 expands and develops showing a trapezoid side view at a time of developing. Another components are same as the components shown in FIG. 1. The inflator bag 60 is made up of a ceiling plate 62, a bottom plate 63, folded lines 65 and triangle shaped overlaid and folded portions 66.

According to the height of the gore portions 64 on the back side and the height of the gore portions 64 on the front side, a size of folded allowance (a size of overlapped portion when being folded) on the front side and a size of folded allowance on the back side become different. So that a size of the triangle-shaped overlaid and folded portions 66 on a back side is relatively thicker than a size of the triangle-shaped overlaid and folded portions 66 on a front side.

With the inflator bag 60, a same interaction effect as the inflator bag 50 shown in FIG. 1 can be obtained. Therefore, when the inflator bag 60 develops, as shown in FIG. 3, the ceiling plate 62 develops in a slant direction toward the bottom plate 63 so that a vehicle occupant hip portion restraining device shown in FIG. 12 or a vehicle occupant leg portion restraining device shown in FIG. 13 can exhibit a high effect by setting the inflator bag 60 with a consideration of setting direction.

When the inflator bag 60 is formed as a module, for example, as shown in FIG. 2(b), an inflator (not shown) is set with a concave portion 69 formed on the bottom plate 63 and a gas outlet is set on a small hole (not shown) formed on the concave portion 69, after that, the inflator is fixed on the bottom plate 63 using a blanket 68. As a result an air bag module is assembled.

Next, a method of forming above inflator bag will be described.

Fist, an example where the bottom plates 53 and 63 are set with the bag main bodies 51 and 61 in a later step is described.

In cases that the inflator is formed with a resin sheet, at first, bag main bodies 51 and 61 are formed. As a method of producing, a vacuum blow forming method or a like can be applied as follows. The box-shaped bag main bodies 51 and 61, that have the ceiling plates 52 and 62, are formed easily by fitting the resin sheet on inside face of a mold. At the time, positions of the folded lines 55 and 65 are formed in a slightly curved shape, This process makes the folded lines 55 and 65 carry out a function of folding the gore portions 54 and 64 on the positions of the folded lines 55 and 65 easily. Therefore the folded lines 55 and 65 can be formed later using some method. After forming the bag main bodies 51 and 61 to be a expanding and developing state, next, by folding the bag main bodies 51 and 61 and blocking the bottom plates 53 and 63 with adhesion at a same time, as a result, the inflator bags 50 and 60, which have a hermetically sealed structure, are formed.

On the other hand, in a case that the inflator is formed with a metal sheet (iron plate, aluminum plate, or a like), at first, the bag main bodies 51 and 61 are pressed into shapes. At this time, it is same as the case of forming with the resin sheet to form the positions of the folded lines 55 and 65 in a slightly curved shape or to form the folded lines 55 and 65 later using some method. After forming the bag main bodies 51 and 61 to be a expanding and developing state, next, by folding the bag main bodies 51 and 61 and blocking the bottom plates 53 and 63 with adhesion, swaging, or a like at a same time, as a result, the inflator bags 50 and 60,which have a hermetically sealed structure, are formed.

Next, an example of the method of producing a one-piece type inflator bag, in that the bottom plates 53 and 63 and the bag main bodies 51 and 61 are formed integrally, is described by referring to FIG. 4.

In a case that the inflator bag is formed with a resin sheet, a formed body 71, as shown in FIG. 4(*a*), is obtained by fitting the resin sheet along the inner side of the mold with a compressed air forming method or a vacuum blow forming method. At this time, positions of the folded lines 75 are formed in a slightly curved shape. Next, as shown in FIG. 4(*b*), the formed body 71 is compressed in a folded state with a press mold method or a like, at a same time, a flange 74, which is used at a setting time, is formed on around the ends of a bottom plate 73. Lastly, as shown in FIG. 4(*c*), by blocking a opening portion 76 to use for introducing a compressed air or a like with melting or a like, so as to obtain the inflator bag 70 having a hermetically sealed structure.

Moreover, in a case that an inflator is formed with a resin, a method to produce a PET (Poly Ethylene Terephthalate) bottle can be used, too. In that case, at first, by an injection molding method, a tube pre-form having a blockaded point is formed, next, the pre-form warmed up to the softening temperature is set into a mold and, by introducing compressed air into the pre-form to expand the pre-form, the blow forming is performed along inner face of the mold. Furthermore, the formed body is folded by denting on the position of the folded line, finally the opening portion to use for introducing the compressed air is blocked, as a result, the inflator bag having a hermetically sealed structure is obtained. Therefore, the formed body of this case is not formed using the resin sheet precisely, though the actual formed body is likely formed using the resin sheet. So this formed body is considered as the formed body made of the resin sheet.

On the other hand, in a case where a one-piece type body inflator bag is formed using a metal sheet, at first, by performing a press forming on the metal sheet, a vessel-shaped pre-form (not shown) having a blockaded point is formed. Next, the vessel-shaped pre-form is put into the mold and, by introducing a incompressible high pressure fluid (water, oil, rubber, or a like) into inside of the vessel-shaped pre-form, and also by stretching the vessel-shaped pre-form, bulge processing is performed along inner face of the mold. Next, the high-pressure fluid introduced inside is exhausted and after the mold is taken off from the bulge formed body, using the press formed body or a like, by folding the formed body on the positions of the folded line formed like mentioned above, the expansion allowance when filling the gas is given. Finally, the opening portion to use for introducing the compressed air is blocked with processing of closing or a like, as a result, the inflator bag having a hermetically sealed structure is obtained.

Thus, by forming the one-piece type inflator bag without seams integrally, it becomes possible to increase the reliability of the hermeticity and to achieve decreasing a cost greatly because its production is easy.

Therefore, in a case where the inflator bag is formed using the metal sheet, not using the bulge processing, by performing the press forming on a thin metal plate so as to form a vessel-shaped formed body, further, by performing of squeezing processing on a opening portion of the formed body gradually, finally by performing the closing processing, as a result the inflator bag having a hermetically sealed structure can be obtained. In this case, it is also, when filling of the gas, the expansion allowance is given by folding the formed body before performing the closing processing.

Third Embodiment

Figure 5:
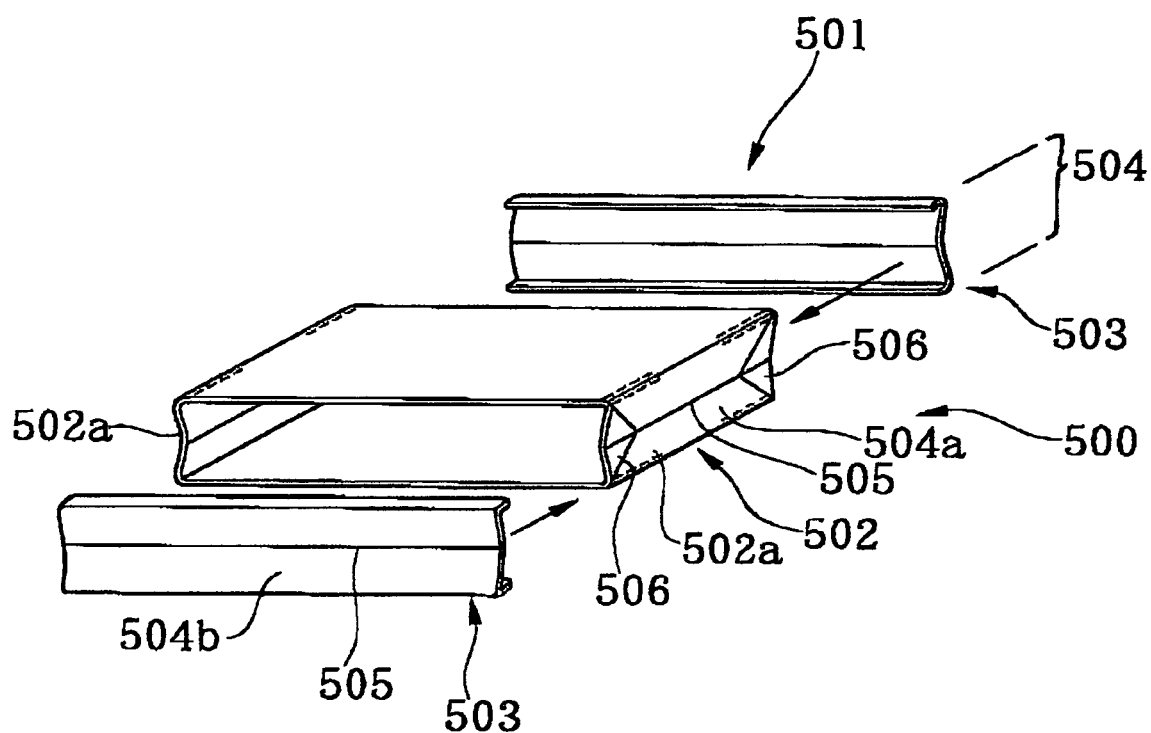
FIG. 5 is an exploded perspective view showing configurations of an inflator bag according to a third embodiment of the present invention.
Figure 6:
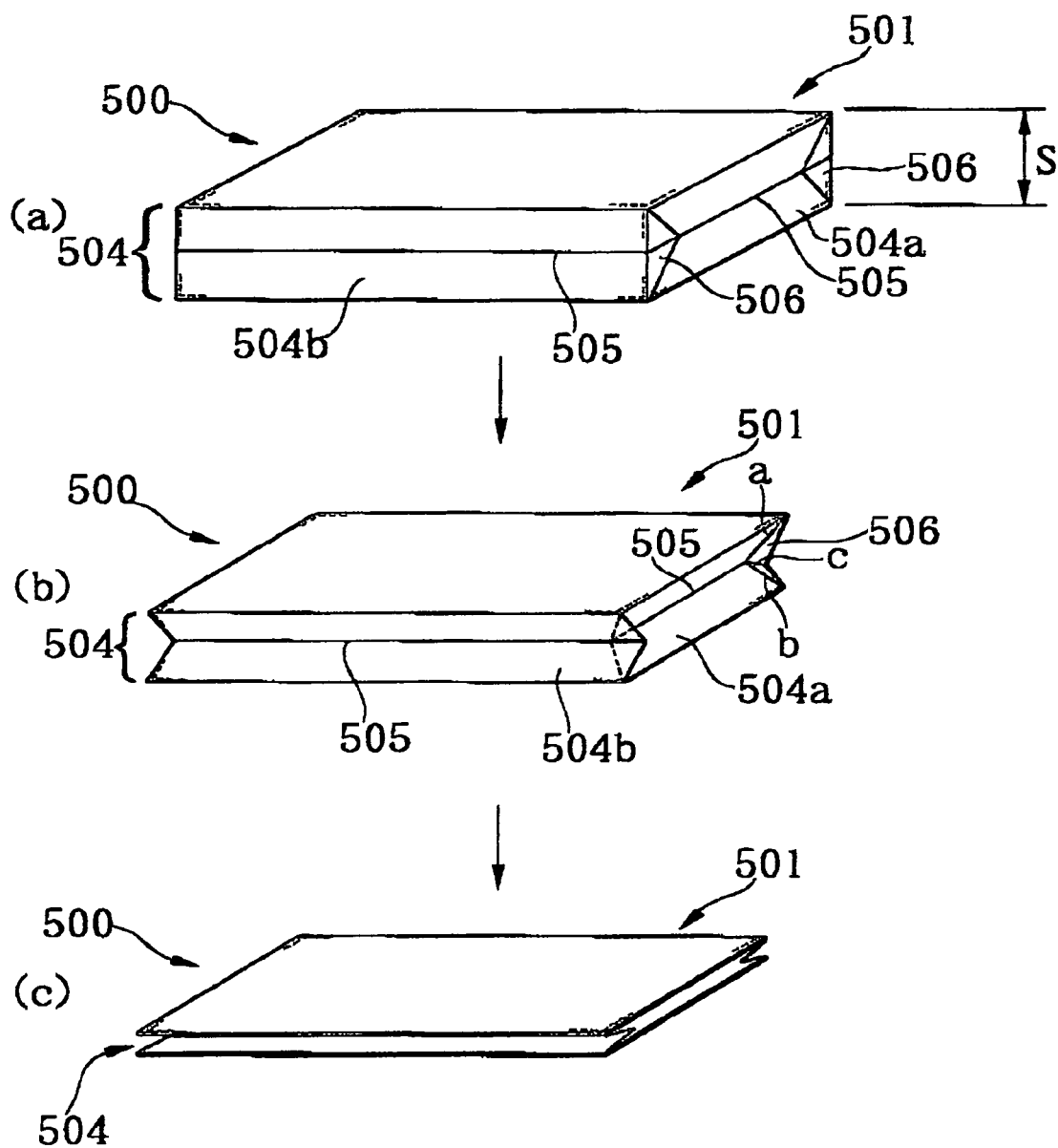
FIG. 6 is an appearance perspective view showing configurations of the inflator bag shown in FIG. 5.

FIG. 5 is an exploded perspective view for showing configurations of an inflator bag 500 according to a third embodiment of the present invention. FIG. 6 is an appearance block diagram showing configurations of the inflator bag 500, rig. 6(*a*) is a diagram showing a before state of shrinking, FIG. 6(*b*) is a diagram showing a state during shrinking, FIG. 6(*c*) is a diagram showing a state after shrinking.

The inflator bag 500 has a hermetically sealed structure and expands and develops by being filled with a high-pressure gas. To obtain the inflator bag 500, as shown in FIG. 5, a tube-shaped body 502 having an approximately rectangular cross-section whose longitudinal side is relatively thinner than its horizontal side is prepared. Moreover, by blocking the opening faces on both sides of the tube-shaped body 502 with face plates 503, and, by using side face plates 502*a* serving as longitudinal sides of the tube-shaped body 502 and the end face plates 503 as gore portions 504, and by serving a upper face plate 502*b* and lower face plates 502*c* of the tube-shaped body 502 as upper and lower face portions, as a result, a box-shaped bag main body 501 is formed. Furthermore, during a process of forming the box-shaped bag main body 501 or after the process of forming the box-shaped bag main body 501, a folded line 505 to be folded, in a manner to form a valley line, toward an inside of the box-shaped bag main body 501 is formed in an intermediate portion of each of the gore portions 504 in a height direction. A triangular overlaid and folded portion 506 is formed in an end of each of said gore portions 504*a* on each of the surrounding side faces with each corner portion of the box-shaped bag main body 501 being sandwiched between one surrounding side face and another surrounding side face adjacent to the one surrounding side face in which the gore portion 504*b* is folded in an overlaid manner in the overlaid and folded portion 506 at a same time when another gore portion on another surrounding side face is folded. The box-shaped bag main body 501 is folded in a manner so as to be in a flat state when each of the gore portions 504 is folded in a manner to form a valley line along the folded line 505 so as to have the inflator bag 500 in a shrinking state is obtained. Actually, after this, for example, on a small hole (not shown) formed on the lower face plate 502c of the inflator bag 500 is set a gas outlet (not shown) for an inflator (not shown), and by setting the inflator with the lower face plate 502c, as a result, an air bag module (not shown) is completed.

The triangle-shaped overlaid and folded portion 506 is, as shown in FIG. 6(b), folded toward the inside of the tube-shaped body 502 on lines a line and b line of triangular outside ends and folded toward opposite direction of the inside of the tube-shaped body 502 on line c line of the folded line 505 so that to be overlaid adjacent the gore portions 504b. Thus gore portions 504a and 504b, which are adjacent each other sandwiching the corner, can be folded surely without interference each other even on the corner (FIG. 6(c)).

The inflator bag 500 ensures the gore portion 504 made up of the both side face plates 502a on a vicinity side face of the box-shaped bag main body 501 and the end face plates 503 for closing the both end opening faces so that the inflator bag 500 can ensure a enough developing stroke, as shown in FIG. 6. Furthermore, on the side face plates 502a and the end face plates 503 which are made up of the gore potions 504 the fold lines 505 which fold toward inside in a manner of the valley is formed, and at a same time, on one end portion of the gore portions 504a which are formed on one surrounded side sandwiched the corner portion of the box-shaped bag main body 501, the triangle overlaid and folded portion 506 is formed so that the box-shaped bag main body can be folded flatly and can be housed in a thin compact state. Therefore when the inflator bag 500 develops the expansion of the folded line portions 505, which allows the inflator bag 500 to develop to uniform height stably so as to improve the support ability for the vehicle occupant. More, the box-shaped bag main body 501, which expands and develops, can be obtained as follows, at first, the tube-shaped body 502 having a rectangular cross section is prepared and by blocking the both end opening faces with the end face plates 503. Above way is quite more easily and has an advantage to be a low cost to form the box-shaped bag main body 501 compared with the conventional way of bellows.

Figure 7:
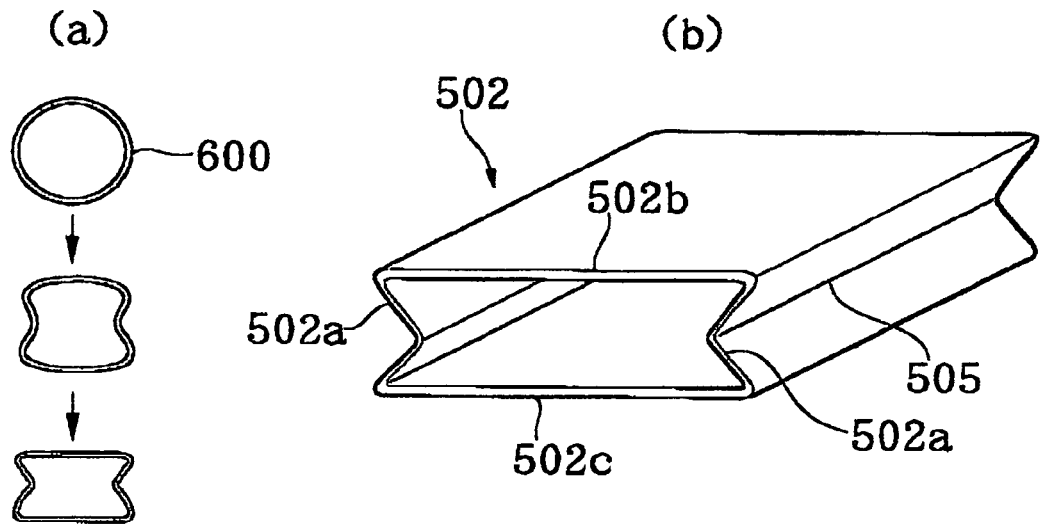
FIG. 7 is an explanation diagram of the inflator bag shown in FIG. 5 when a rectangular tube body is formed using a round shape pipe.
Figure 8:
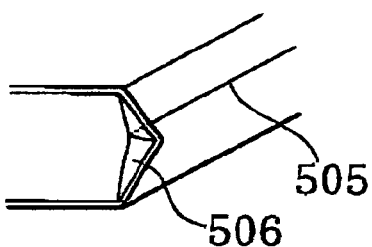
FIG. 8 is a main perspective view illustrating one example in which an end portion of the rectangular tube body is formed.

In addition, as the tube-shaped body 502, an extrusion process material or a like can be used as it is, though, as shown in FIG. 7(a), a circular-shaped pipe 600 cut in a specific length can be used being deformed gradually, as shown in FIG. 7(b), so as to form the circular-shaped pipe 600 having approximately rectangular shaped cross section view and its longitudinal side is relatively thinner than its horizontal side. In the case, not only during a deforming process of the tube-shaped body 502, at a same time, the folded lines 505 to be folded toward the inside in a manner of the valley can be formed in an intermediate portion in a height direction of the side face plate 502a, which corresponds to the longitudinal side, but also after the tube-shaped body 502 is completed to be formed, the folded lines 505 can be formed. Furthermore, as shown in FIG. 8, the triangle overlaid and folded portions 506 can be formed during the deforming process of the tube-shaped body 502 or after the tube-shaped body 502 is completed to be formed.

Figure 9:
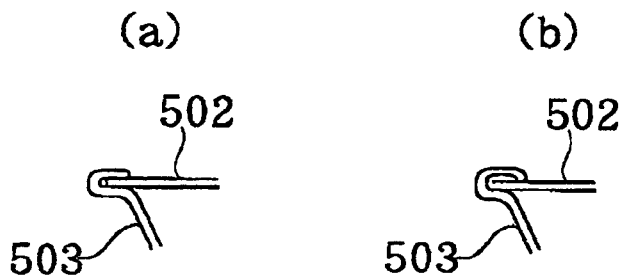
FIG. 9 is a diagram illustrating a process example, FIGS. 9(a) and 9(b), of a join portion where a rectangular tube body and an end face plate are connected.

Furthermore, for joining the end face plates 503 with the tube-shaped body 502 is, for example, other than welding, heming process, as shown in FIGS. 9(a) and 9(b), can be applied.

And in above example it is assumed that the box-shaped bag main body 501 is configured with a metal material, but the resin strengthen by fiber is possible to form the box-shaped bag main body 501.

Fourth Embodiment

Figure 10:
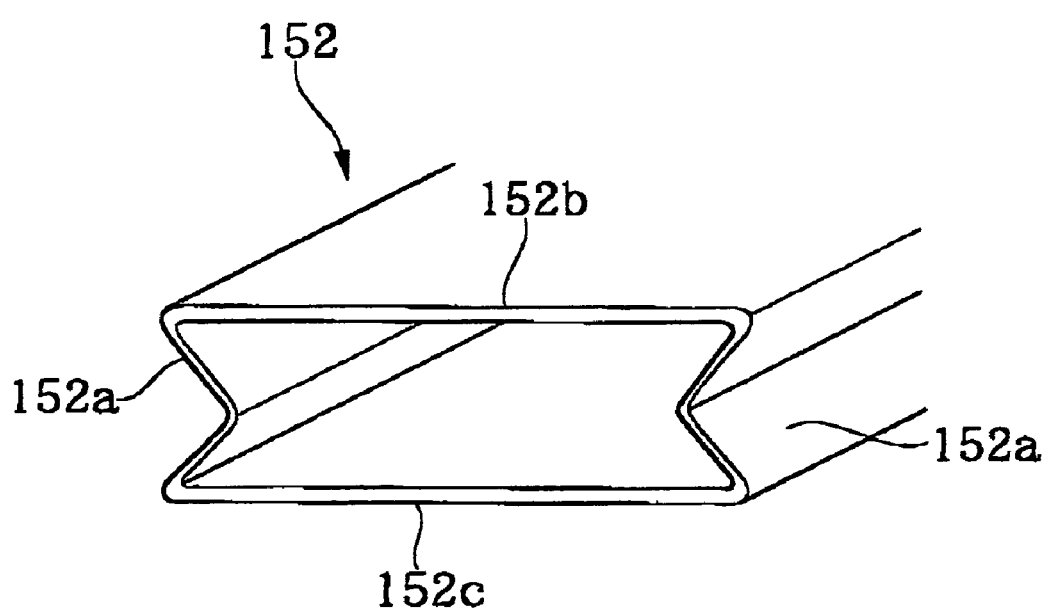
FIG. 10 is a main perspective view illustrating one example of a rectangular tube body having uneven thickness and making up an inflator bag according to a fourth embodiment of the present invention.

FIG. 10 is a diagram showing a part of an inflator bag according to a fourth embodiment of the present invention. As shown in FIG. 10, a tube-shaped body 152 is so constructed that plates making up the tube-shaped body 152 have unequal wall thicknesses wherein wall thicknesses of its upper-face plate 152b and its lower-face plate 152c both serving as horizontal sides of the tube-shaped body 152 are large and wall thicknesses of its side face plates 152a serving as longitudinal sides are relatively thinner than the wall thicknesses of the upper-face plate 152b and the lower-face plate 152c and wall thicknesses of the end face plates (not shown in FIG. 10) to use for blocking opening portions of the tube-shaped body 152 are equal to the wall thicknesses of the side face plates 152a. In this case the inflator bag, in which the upper and lower face portions have great thickness and the gore portions have less thickness, is configured.

Therefore, the inflator bag is configured with uneven wall thicknesses, like mentioned above, so that the upper-face portion and the lower-portion of the inflator bag expand not in a state of a potbelly, but in a uniform manner. Therefore in case a hip portion or a leg portion of a vehicle occupant being seated on a seat is supported using the upper-face portion of the inflator bag, energy can be picked and absorbed by the inflator bag evenly. Furthermore, the gore portion is thinner so that the inflator can be expanded and developed quickly.

Fifth Embodiment

Figure 11:
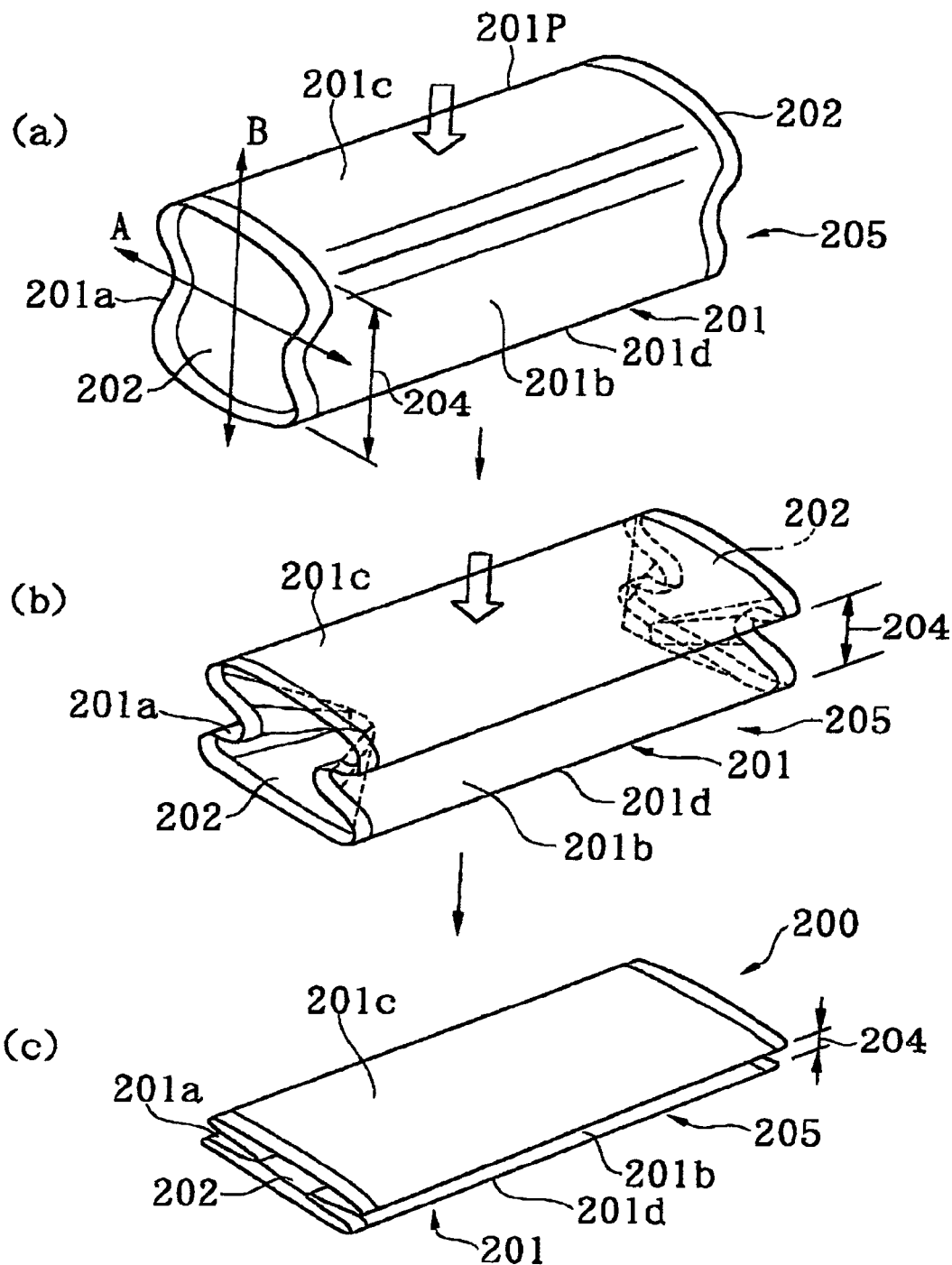
FIG. 11 is a perspective view of an inflator according to a fifth embodiment of the present invention and also

FIG. 11 is a perspective view for showing an inflator bag 200 according to a fifth embodiment of the present invention and also FIGS. 11(a), 11(b), and 11(c) are process diagrams showing a method of manufacturing the inflator bag 200 in order of processes.

The inflator bag 200 has a hermetically sealed structure and expands and develops by being filled with a high-pressure gas. To obtain the inflator bag 200, at first, a hollow body 201P, cut in a specified length, is prepared. As the hollow body 201P, for example, a round-shaped pipe with a thin wall can be used by being pushed out and formed.

Next, as shown in FIG. 11(a), by denting both side faces 201a and 201b (right and left faces) in a horizontal diameter direction A out of two diameter directions intersecting at right angles of the hollow body 201P toward its inside in a U-shape and by crushing both side faces 201c and 201d (upper and lower faces) in another diameter direction B so as to be in a plane state; as a result, the tube-shaped body 201 being opened at its both sides and having a crushed shape cross-sectional is formed. A bag main body 205, having a hermetically sealed structure, is formed by blocking both the opening portions of the tube-shaped body 201 with end face plates 202 so as to make the side faces 201a and 201b and the end face plates 202 serve as gore portions 204 to ensure a height when the inflator 200 expands and develops.

Next, as shown in the FIG. 11(b), by further denting both side faces 201a and 201b (right and left faces), which are already dented once, of the tube-shaped body 201 and the end face plates 202, which correspond the gore portions 204, toward its inside and by further crushing the both side faces 201c and 201d (upper and lower faces) in another diameter direction to be in a plane state so as to fold the bag main body 205 in a flat state, as a result, the inflator bag 200 in a shrinking state can be obtained (FIG. 11(c)). Actually, after this, for example, on a small hole formed on a lower face of the inflator bag 200 is set a gas outlet for an inflator, as a result an air bag module is completed.

As described above, the inflator bag 200 ensures the gore portions 204 made up of the both side faces 201a and 201b dented toward the inside of the tube-shaped body 201 and the end face plates 202 blocking the both end opening faces with the bag main body 205 so that the inflator bag 200 can ensure a enough developing stroke (FIG. 11(a)). Furthermore, crushing the tube-shaped body 201 by further denting the gore portions 204 toward inside (FIG. 11(b)) makes the bag main body 205 fold flatly so that the inflator bag 200 can be housed in a thin and compact form (FIG. 11(c)).

Therefore when the inflator bag 200 develops, the expansion of the gore portions 204 allows the inflator bag 200 to develop to a uniform height stably so as to improve the support ability for the vehicle occupant. Moreover, to form the bag main body 205, which expands and develops, at first, the hollow body 201P (a circular tube or a like) is prepared and by crushing the hollow body 201P slightly to become the tube-shaped body 201 with a transformation section, being like a rectangle shape, by blocking the both end opening faces with the end faces plates 202 as a result the bag main body 205 is completed. Above way is quite more easily and simpler to form the bag rain body 205 compared with the way of bellows.

Sixth Embodiment

Figure 12:
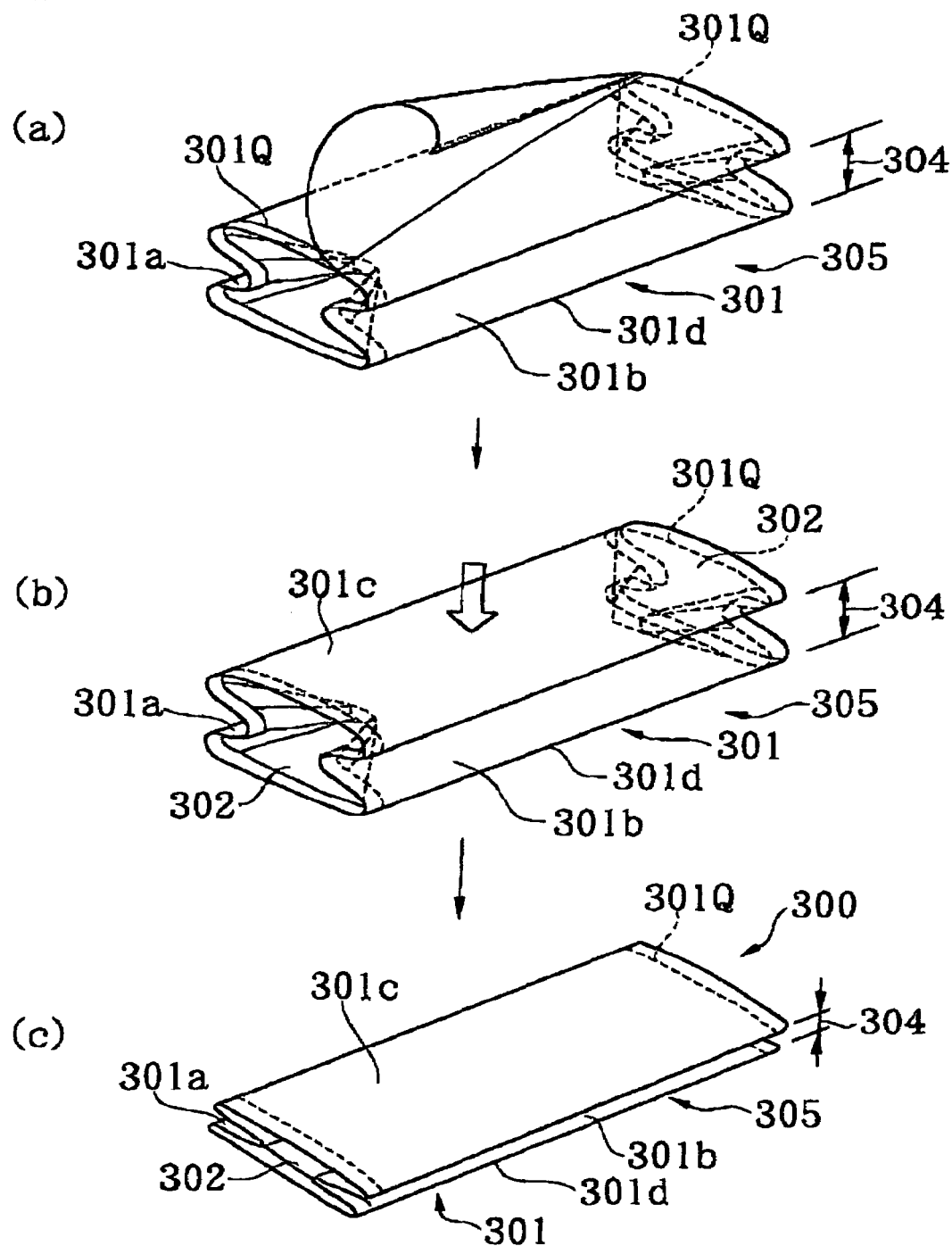
FIG. 12 is a perspective view of an inflator 300 according to a sixth embodiment of the present invention and also
Figure 15:
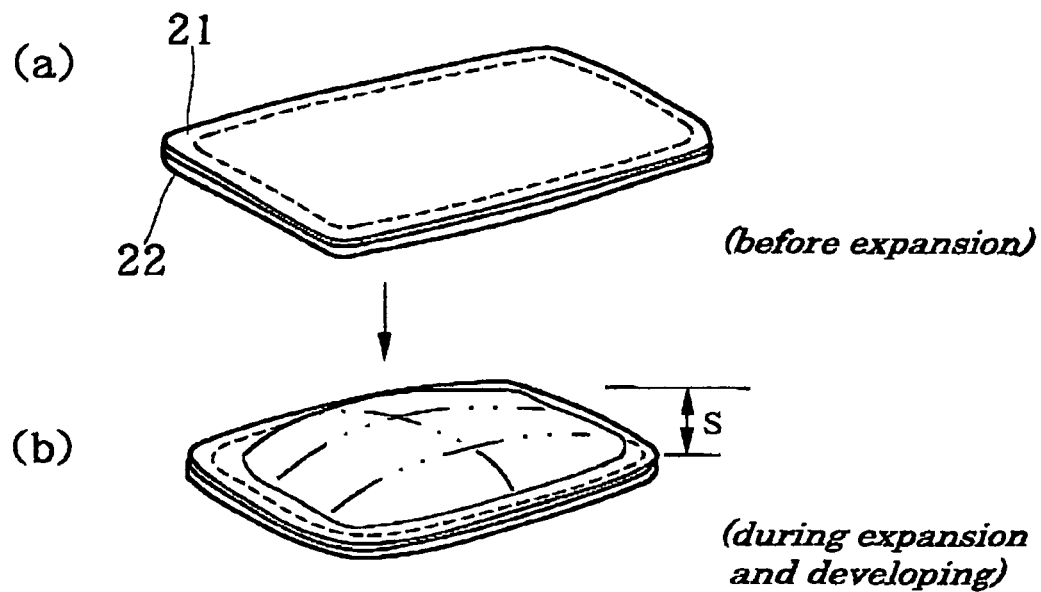
FIG. 15 is a block diagram showing another conventional inflator bag.
Figure 16:
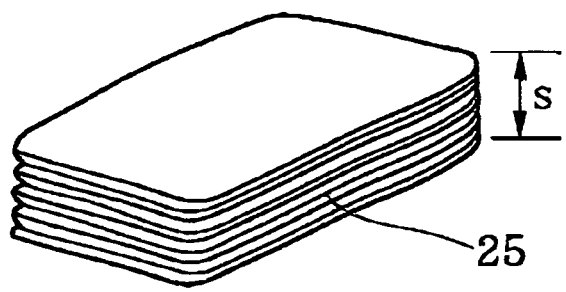
FIG. 16 is a block diagram showing yet another conventional inflator bag.

FIG. 12 is a perspective view for showing an inflator bag 300 according to a sixth embodiment of the present invention and FIGS. 12(a), 12(b), and 12(c) show process diagrams showing a process of manufacturing in order of processes. In the sixth embodiment of the present invention, not likely described in a fifth embodiment, a process of crushing from a state of FIG. 11(a) to a state of FIG. 11(b) is omitted so that the state of FIG. 12(b) is formed directly.

The inflator bag 300 in the sixth embodiment is also so configured to have a hermetically sealed structure that expands and develops by being filled with a high-pressure gas. At first, to obtain the inflator bag 300, one pair of belt-type frame body 301Q having a gourd shape is prepared with a rectangular-shaped metal sheet 301P cut in a specified size. Here, it is desirable that a flat rate of the belt-type frame body 301Q having the gourd shape is set to 30% to 60% assuming the bag main body 300 is assumed to be expanded and developed when completing.

Next, as shown in FIG. 12(a), the one pair of belt-type frame bodies 301Q is made to face each other separating only the distance that corresponds between a right side edge part and a left side edge part in a direction of width of the metal sheet 301P. After this, along a periphery of the belt-type frame bodies 301Q which are facing each other, the periphery of the belt-type frame bodies 3010 is wrapped wavy with the right side edge part and the left side edge part in the direction of width of the metal sheet 301P sequentially so as to form a tube-shaped body 301 in which both ends are open and which has a gourd-shaped cross section (FIG. 12(b)). Next, by blocking the both end opening faces of the tube-shaped body 301 with an end face 302 being a sheet shape and being shrunk and crumpled (shrink) toward inside of the bag main body 300 in advance, a gore portion 304 to ensure a height for expansion and development can be obtained with both side faces 301a and 301b and end face plates 302 being dented toward inside of the tube body, as a result, a bag main body 305 having a hermetically sealed structure is formed. Here, when the main body bag 300 in a finished situation expands and develops, the shrinkage condition of the end side material 302 is set to be the state of the tension (expansion).

Next, as shown in FIG. 12(c), by further denting both side faces 301a and 301b (right and left faces), which are already dented once, of the tube-shaped body 301 and the end face plates 302, which correspond to the gore portions 304, toward its inside and by further crushing the both side faces 301c and 301d (upper and lower faces) in another diameter direction B to be in a plane state so as to fold the bag main body 305 in a flat state, as a result, the inflator bag 300 in a shrinkage state can be obtained. Actually, after this, for example, on a small hole formed on a lower face of the inflator bag 300 is set a gas outlet for an inflator, as a result a air bag module is completed.

With the configurations of this embodiment, approximately same effect mentioned above in the fifth embodiment can be obtained. As a modification example of this embodiment, the belt-type frame body 301Q can be taken off between a completion of the tube-shaped body 301 and a completion of the bag main body 305.

INDUSTRIAL APPLICABILITY

As described above, an inflator bag related to the present invention can be used as an inflator bag of a vehicle occupant hip portion restraining device mounted in a vehicle and as an inflator bag of a vehicle occupant leg portion restraining device. Compared with a conventional bellows-type, processing is easy and there is an advantage to produce at a low cost.

What is claimed is:

1. An inflator bag for a vehicle occupant restraining apparatus being able to expand and develop by a high-pressure gas filled in said inflator bag and is capable of restraining a vehicle occupant by being expanded and developed, comprising:

a box-shaped bag main body having gore portions on surrounding side faces to ensure a height of said box-shaped bag main body, wherein, in said gore portions, a folded line to be folded toward an inside of said box-shaped bag main body is formed in an intermediate portion in a height direction of said gore portions, which is used to allow said gore portions to be folded; and an overlaid and folded portion formed in an end of said gore portions on said surrounding side faces with corner portions of said box-shaped bag main body being sandwiched between one surrounding side face and another surrounding side face adjacent to said one surrounding side face, wherein said gore portions are folded in a overlaid manner in said overlaid and folded portions at a same time when another gore portion on another surrounding side face is folded, wherein said box-shaped bag main body is folded in a manner so as to be in a flat state when said gore portions are folded in a manner to form a valley line along said folded line, wherein said box-shaped main body comprises a flat bottom plate and a ceiling plate opposite said bottom plate, and wherein the ceiling plate is slanted with respect to the bottom plate.

2. The inflator bag for the vehicle occupant restraining apparatus according to claim 1, wherein said box-shaped bag main body comprises a hermetically sealed structure by blocking a bottom face of said box-shaped bag main body being opposite to a ceiling plate with a bottom plate.

3. The inflator bag for the vehicle occupant restraining apparatus according to claim 1, wherein said box-shaped bag main body and said bottom plate are integrally formed.

4. The inflator bag for the vehicle occupant restraining apparatus according to claim 1, wherein said box-shaped bag main body includes a resin sheet or a metal sheet.

5. The inflator bag for the vehicle occupant restraining apparatus according to claim 1, wherein said box-shaped main body has a rectangular cross-section,
- wherein a longitudinal side of said box-shaped main body is smaller than a horizontal side of said box-shaped main body, and
- wherein opening faces on both sides of a tube-shaped body are blocked with end face plates and side face plates serving as said longitudinal side of said tube-shaped body and said end face plates make up gore portions.

6. The inflator bag for the vehicle occupant restraining apparatus according to claim 5, wherein said tube-shaped body comprises plates having unequal wall thicknesses, wherein wall thicknesses of an upper-face plate and a lower-face plate both serving as horizontal sides of said tube-shaped body are large, and wall thicknesses of side face plates serving as longitudinal sides are smaller than said wall thicknesses of said upper-face plate and said lower-face plate and wall thicknesses of said end face plates are equal to said wall thicknesses of said side face plates.

7. The inflator bag for the vehicle occupant restraining apparatus according to claim 5, wherein said tube-shaped body is angularly tube-shaped.

8. The inflator bag for the vehicle occupant restraining apparatus according to claim 5, wherein said tube-shaped body is circularly tube-shaped.

9. The inflator bag for the vehicle occupant restraining apparatus according to claim 1, wherein said inflator bag restrains a hip portion of a vehicle occupant which is mounted in a front lower portion of a seat cushion in a vehicle and expands and develops by being filled with a high-pressure gas at a time of sharp reduction of speed of a vehicle to raise a front seat face of said seat cushion which prevents a vehicle occupant being seated on a seat from being moved forward.

10. The inflator bag for the vehicle occupant restraining apparatus according to claim 1, wherein said inflator bag is used for restraining a leg portion of a seated vehicle occupant which is placed in a lower portion of an instrument panel of a vehicle and expands and develops at time of being filled with a high-pressure gas at a time of sharp reduction of speed of a vehicle.

11. The inflator bag for a vehicle occupant restraining apparatus according to claim 1, wherein said box-shaped bag main body comprises an angular-box shaped bag main body.

12. The inflator bag for the vehicle occupant restraining apparatus according to claim 1, wherein said folded portion comprises a triangular folded portion.

13. The inflator bag according to claim 1, wherein said overlaid and folded portion formed on a front side of the main body is thicker than said overlaid and folded portion formed on a rear side of the main body.

14. The inflator bag according to claim 1, wherein said ceiling plate comprises a first end that contacts said flat bottom plate and a second end separated from said flat bottom plate, and
- wherein a slope of said ceiling plate continuously increases from said first end to said second end.

15. The inflator bag according to claim 1, wherein opening faces on both sides of a tube-shaped body are blocked with end face plates and side face plates serving as a longitudinal side of said tube-shaped body and said end face plates make up gore portions.

* * * * *